Reissued Jan. 30, 1945 Re. 22,597

UNITED STATES PATENT OFFICE 22,597

PARASITICIDAL PREPARATIONS

Elbert C. Ladd, Passaic, N. J., assignor to United States Rubber Company, New York, N. Y., a corporation of New Jersey No Drawing. Original No. 2,362,564, dated November 14, 1944, Serial No. 485,886, May 6, 1943. Application for reissue December 9, 1944, Serial No. 567,345

5 Claims. (Cl. 167—30)

This invention relates to new and useful improvements in parasiticidal preparations, more particularly to germicides, that is, fungicides and bactericides, and to insecticides, the latter term being considered to include larvicides and arachnicides, as well as insectifuges and larvifuges. The invention further relates to methods of protecting organic material subject to attack by microorganisms, as in the immunizing of seed, and the mildewproofing of fabrics and other material.

I have found that 2,2,4,6,6-pentachloro-4-cyclohexenedione-1,3 is an effective germicide and insecticide. The structure of the compound may be represented as follows:

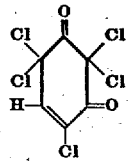

The graphic formula for the compound and method of preparation are described in Zincke and Rabinowitsch in Berichte, vol. 23, pages 3768 and 3777 (1890). It is there called pentachlor-m-diketo-R-hexen (the R stands for "ring," meaning cyclo), and pentachlorresorcin.

The 2,2,4,6,6-pentachloro-4-cyclohexenedione-1,3 may be used as a seed protectant and to protect plants or soil from organisms harmful to seeds and plants. It may also be applied to prevent or retard fungus growth and the formation of, for example, mildew on rope, wood, fur, hair, feathers, cotton, wool, leather, rubber, rubberized or synthetic resin-coated fabrics, and the like. The 2,2,4,6,6-pentachloro-4-cyclohexenedione-1,3 may be applied as dust or sprays or in solution in a suitable solvent. It may be applied diluted or undiluted, or mixed with carrier, or other fungicides, germicides or insecticides, fertilizers, hormones, buffering or safening agents.

The following examples are given to illustrate the invention:

*Example I*

Pea seed, variety Perfection, were tumbled with .25% by weight of the 2,2,4,6,6-pentachloro-4-cyclohexene-dione-1,3 in dust form. The seeds were then planted in soil known to be infested with a number of organisms, including *Pythium ultimum*. The effectiveness of the fungicide was determined by comparing the number of treated seeds which germinated and developed into healthy plants with an equal number of untreated seeds planted under the same conditions. Observations made at the end of ten days showed that 78% of the treated seeds had germinated and grown to healthy seedlings, whereas only 14% of the untreated seeds had germinated.

*Example II*

This case illustrates the effectiveness of 2,2,-4,6,6-pentachloro-4-cyclohexenedione-1,3 as a bactericide. .5% by weight of 2,2,4,6,6-pentachloro-4-cyclohexenedione-1,3 was suspended in water which contained 2% of Emulphor-EL (believed to be reaction product of fatty acid or fatty acid ester with ethylene oxide) as a dispersing agent. A section of potato was immersed in this suspension and allowed to stand at room temperature. No growth of naturally occurring bacteria was observed after thirty days. On the other hand, a section of potato treated in a similar manner with a 2% solution of Emulphor-EL in water, which solution did not contain a germicide, became heavily overgrown with naturally occurring bacteria within the same period of time.

*Example III*

The arachnicidal properties of 2,2,4,6,6-pentachloro-4-cyclohexenedione-1,3 are shown by the following test:

1 part by weight of 2,2,4,6,6-pentachloro-4-cyclohexenedione-1,3 was suspended in 200 parts of water which contained ½ part of Nacconal (wetting agent). The dispersion was then sprayed on bean plants heavily infested with red spiders. Counts taken 72 hours after spraying showed that 100% of the spiders had been killed while control plants which had been sprayed with water containing .25% of Nacconal but without the 2,2,4,6,6-pentachloro-4-cyclohexenedione-1,3 showed 10% dead.

*Example IV*

The repellent properties of 2,2,4,6,6-pentachloro-4-cyclohexenedione-1,3 are shown by the following test:

4 pieces of woolen cloth 1½" x 4" were immersed in a 5% solution by weight of the chemical in acetone until saturated with the solution, then removed, air-dried to remove the acetone, and each placed in a separate covered petri dish containing 5 black carpet beetle larvae, and allowed to stand in a dark place at room temperature for three weeks. Four similar pieces of untreated woolen cloth were placed in separate petri dishes, each containing five black carpet beetle larvae and then allowed to stand for three weeks under equal conditions. At the end of this period it was found that no surface feeding had occurred on the treated samples, whereas very heavy feeding had occurred on the untreated samples. Furthermore, 100% of the larvae exposed to the treated samples were dead, whereas there was no mortality in the larvae exposed to the untreated samples.

Having thus described my invention, what I claim and desire to protect by Letters Patent is:

1. A fungicidal composition comprising a carrier and 2,2,4,6,6-pentachloro-4-cyclohexenedione-1,3 as an essential active ingredient.

2. The method of protecting organic material subject to attack by microorganisms which comprises treating said organic material with 2,2,4,6,6-pentachloro-4-cyclohexenedione-1,3.

3. The method of protecting seeds, plants and soil, subject to attack by fungi, bacteria and insects which comprises treating said material with 2,2,4,6,6-pentachloro-4-cyclohexenedione-1,3.

4. The method of immunizing seed which comprises treating said seed with 2,2,4,6,6-pentachloro-4-cyclohexenedione-1,3.

5. The method of controlling mildew on organic material which comprises treating said organic material with 2,2,4,6,6-pentachloro-4-cyclohexenedione-1,3.

ELBERT C. LADD.